United States Patent Office 2,792,387
Patented May 14, 1957

2,792,387
WOOD STAIN FILLER COMPOSITIONS

Carl Berger and Walter S. Hogue, Dayton, Ohio, assignors to The Commonwealth Engineering Company of Ohio, Dayton, Ohio, a corporation of Ohio No Drawing. Application August 4, 1954,
Serial No. 447,916

11 Claims. (Cl. 260—210)

This invention relates to wood stain filler compositions, and more particularly to a method of producing a novel wood stain and filling composition utilizing flavanoids.

Stains and the like compositions for filling and coloring wood have been utilized heretofore in the treatment of wood. However, many of the prior stains and wood filling compositions do not have the light fastness and property of coloring the wood without raising the grain.

The present invention comprises a staining composition for application to wood and which is fast to light and does not raise the grain of the wood.

The invention further provides a product which is made utilizing flavanoids such as hesperidin and the like by reacting the same with aluminum chloride in the presence of carbon disulfide. The resultant brown colored product when applied to wood surfaces penetrates the pores of the wood and stains and fills the same, producing a soft brown hue which is fast to light and is weather durable.

In accordance with the invention, the wood stain is prepared by refluxing hesperidin with aluminum chloride in a solution of carbon disulfide. The stain composition is produced by refluxing the constituents for several hours and then extracting the resultant brownish colored stain with a solvent such as dioxane, pyridine, water or the like in which it is soluble.

In accordance with the invention, flavanoid compounds such as hesperidin, hesperidin chalcone and the like flavanoids are reacted with aluminum chloride to produce the wood coloring strain composition or dye.

Hesperidin has the general structural formula—

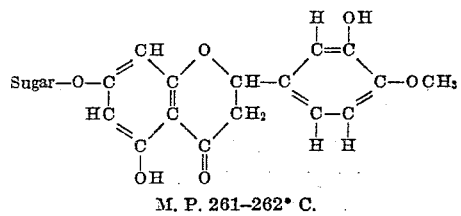

M. P. 261–262° C.

Hesperidin chalcone an isomer of hesperidin which has a melting point of 251–252° C. has the general structural formula

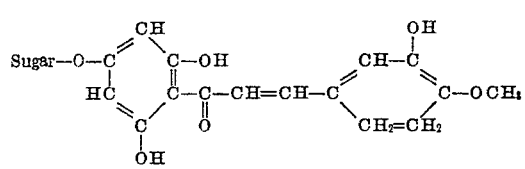

By reacting the flavanoids with aluminum chloride the dark brown reaction product produced is suitable for application to wood to fill and stain the same, the composition being dissolved in appropriate solvents such as ethanol, water, or pyridine.

Hesperetin, which has the general structural formula—

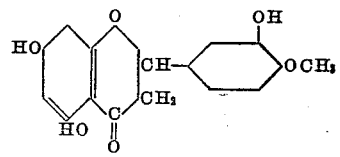

also may be used as the flavanoid in place of hesperidin or its isomer, in preparing the wood staining composition.

The following examples illustrate the wood stain composition of the invention and how it may be prepared.

Example I

Six grams of hesperidin and 2½ grams of aluminum chloride were suspended in 125 milliliters of carbon disulfide. The resultant mixture was then refluxed for fifteen hours over a hot water bath while heated at the boiling temperature of carbon disulfide (approximately 50° C.). Thereafter the reflux treatment was discontinued and the product filtered, the solid material being extracted with pyridine. This pyridine extract consisting of a dark brown solution was then heated to 120° C. to remove the pyridine, the dark brown solid recovered was found to be soluble in ethanol, water and pyridine, and insoluble in ethylene glycol, carbon tetrachloride and chloroform.

Example II

A wood stain was prepared by dissolving one part by weight of the brown staining solid composition of Example I in water, sufficient water being added to form a staining composition. A suitable composition may be prepared consisting of one to ten parts by weight of the dark brown solid dissolved in about one gallon of water.

The stain filler composition thus formed may be applied directly to wood surfaces and penetrates the pores and colors the wood to a brownish hue which is fast to light upon evaporation of the water.

Example III

The grams of hesperidin chalcone and three grams of aluminum chloride are suspended in 150 ml. of carbon disulfide, the mixture is then refluxed for approximately 18 hours, after which the reaction mass is filtered and a solid brownish material recovered using pyridine as the extraction solvent as in Example I.

A suitable stain filler composition may be prepared utilizing the brownish solid material as recovered by dissolving the same in water or ethanol as described in Example II.

Where it is desired inert fillers such as hydrated precipitated calcium silicate, silox, diatomaceous earth, asbestine, clay or the like may be incorporated. The particularly relative proportions of the solid brown staining composition and fillers are employed so as to produce the desired color and stain filling characteristics.

Other solvents may be utilized in compounding the wood stain and filler composition such as ethanol, methanol, isopropanol, and the like in which the coloring stain material is soluble or miscible. Water is utilized where the same does not interfere with the proper penetration and staining of the wood. Mixtures of water with other organic solvents may also be used as desired.

As a modification of the staining composition as described, the filtered reaction product of the refluxed mixture of the flavanoid and aluminum chloride may be used directly by extraction of the same in dioxane, pyridine, or water, in which the brown colored reaction product is soluble. In this instance, a suitable amount of the solvent may be used to produce a dark brown staining solution.

Other polyhydroxy-methoxy flavanones may be reacted with aluminum chloride to produce a suitable wood staining composition.

It will be understood that while there have been given certain specific examples of the wood staining composition and preferred method of application of the same to wood, it is not intended thereby to specifically limit the invention thereto, the same being adapted to be modified to suit different conditions and uses and without departing from the spirit and scope of this invention, as more particularly pointed out in the appended claims.

What is claimed is:

1. A wood staining and filling composition comprising as a coloring dye for the wood a reaction product of a flavanoid with aluminum chloride produced by refluxing the mixture in carbon disulfide and extracting the resultant brown colored reaction product with organic solvent, said flavanoid comprising a polyhydroxy methoxy flavanone, said flavanone selected from the group consisting of hesperidin, hesperidin chalcone, and hesperetin and mixtures thereof, said reaction product being dissolved in a solvent.

2. A wood staining and filling composition comprising as a coloring dye for the wood a reaction product of hesperidin with aluminum chloride produced by refluxing the mixture in carbon disulfide and extracting the resultant brown colored reaction product with organic solvent, said reaction product being dissolved in solvent to produce a liquid staining composition.

3. A wood staining and filling composition comprising as a coloring dye for the wood a reaction product of hesperidin chalcone with aluminum chloride produced by refluxing the mixture in carbon disulfide and extracting the resultant brown colored reaction product with organic solvent, said reaction product being dissolved in solvent to produce a liquid staining composition.

4. A wood staining and filling composition comprising as a coloring dye for the wood a reaction product of hesperetin with aluminum chloride, said reaction product being dissolved in solvent to produce a liquid staining composition.

5. A process of producing a wood staining and filling composition comprising the steps of reacting polyhydroxy methoxy flavanones with aluminum chloride produced by refluxing the mixture in carbon disulfide and extracting the resultant brown colored reaction product with organic solvent, dissolving the resultant reaction product in organic solvent to produce a wood staining composition, said flavanones being selected from the group consisting of hesperidin, hesperidin chalcone and hesperetin.

6. A process of producing a wood staining and filling composition comprising the steps of reacting a mixture of flavanoids with aluminum chloride by refluxing the mixture, said flavanoids being selected from the group consisting of hesperidin, hesperidin chalcone and hesperetin and mixtures thereof, extracting the resultant brown colored reaction product with pyridine, separating the pyridine therefrom and dissolving the resultant product in water to form a brown wood staining composition.

7. A process of producing a wood staining and filling composition comprising the steps of reacting a flavanoid with aluminum chloride by dissolving the mixture in carbon disulfide and refluxing the mixture for several hours, said flavanoids being selected from the group consisting of hesperidin, hesperidin chalcone and hesperetin and mixtures thereof, thereafter filtering off the solid material, extracting the colored material with organic solvent, removing the organic solvent, and dispersing the resultant solid material in water to form a wood staining composition.

8. A process of producing a wood staining and filling composition comprising the steps of reacting a polyhydroxy methoxy flavanone with aluminum chloride by refluxing the mixture while dissolved in carbon disulfide solvent, said flavanoids being selected from the group consisting of hesperidin, hesperidin chalcone and hesperetin and mixtures thereof, extracting the resultant product with organic solvent, treating the extracted material to separate the solvent therefrom, and recovering the coloring material soluble in water.

9. As a new product, a wood staining and filling composition comprising the reaction product of a polyhydroxy methoxy flavanone with aluminum chloride produced by refluxing the mixture in carbon disulfide and extracting the resultant brown colored reaction product with organic solvent said flavanoids being selected from the group consisting of hesperidin, hesperidin chalcone and hesperetin and mixtures thereof and admixing an inorganic filler with the resultant reaction product and dispersing the mixture in water to form a wood staining and filling composition.

10. As a new product, a wood staining and filling composition comprising as its principal constituent the reaction product of a polyhydroxy methoxy flavanone and aluminum chloride produced by refluxing the mixture in carbon disulfide and extracting the resultant brown colored reaction product with organic solvent, said flavanoids being selected from the group consisting of hesperidin, hesperidin chalcone and hesperetin and mixtures thereof, said reaction product being soluble in ethanol, water and pyridine and insoluble in ethanol glycol, carbon tetrachloride and chloroform.

11. A wood staining and filling composition comprising the filtered reaction product of a refluxed mixture of a flavanoid and aluminum chloride produced by refluxing the mixture in carbon disulfide and extracting the resultant brown colored reaction product with organic solvent, said flavanoids being selected from the group consisting of hesperidin, hesperidin chalcone and hesperetin and mixtures thereof, said reaction product comprising a brown colored water soluble wood staining solution.

References Cited in the file of this patent

UNITED STATES PATENTS

| | | |
|---|---|---|
| 2,338,149 | Walker et al. | Jan. 4, 1944 |
| 2,632,710 | Mayers | Mar. 24, 1953 |
| 2,748,107 | Hendrickson et al. | May 29, 1956 |

OTHER REFERENCES

Merck Index, pages 814–5 (1952).

Brune: Naturwissenschaften, vol. 41, pages 373–4 (1954).